United States Patent
Wang et al.

(10) Patent No.: US 10,827,440 B2
(45) Date of Patent: Nov. 3, 2020

(54) INDICATION OF POTENTIAL NR UL TRANSMISSION IN NE-DC

(71) Applicant: QUALCOMM Incorporated, San Diego, CA (US)

(72) Inventors: Xiao Feng Wang, San Diego, CA (US); Wanshi Chen, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/670,884

(22) Filed: Oct. 31, 2019

(65) Prior Publication Data
US 2020/0145934 A1    May 7, 2020

Related U.S. Application Data

(60) Provisional application No. 62/755,385, filed on Nov. 2, 2018.

(51) Int. Cl.
*H04J 3/00* (2006.01)
*H04W 52/36* (2009.01)
(Continued)

(52) U.S. Cl.
CPC ............. *H04W 52/36* (2013.01); *H04L 5/14* (2013.01); *H04W 72/1263* (2013.01); *H04W 88/06* (2013.01)

(58) Field of Classification Search
CPC . H04W 52/38; H04W 72/0473; H04W 72/14; H04W 52/367; H04W 72/1289; H04W 74/0841; H04W 88/06
See application file for complete search history.

(56) References Cited

U.S. PATENT DOCUMENTS

2012/0327821 A1   12/2012   Lin et al.
2014/0056186 A1*  2/2014   Gao ............... H04B 7/2656
                                                            370/280
(Continued)

FOREIGN PATENT DOCUMENTS

WO      2013137677 A1    9/2013

OTHER PUBLICATIONS

3GPP TS 38.331 V15.2.0 (Jun. 2018).*
International Search Report and Written Opinion—PCT/US2019/059479—ISA/EPO—dated Feb. 13, 2020.

*Primary Examiner* — Abdelillah Elmejjarmi
(74) *Attorney, Agent, or Firm* — Procopio, Cory, Hargreaves & Savitch, LLP

(57) ABSTRACT

An apparatus communicates using a first Radio Access Technology (RAT) and a second RAT. The apparatus receives a first Time Division Duplex Uplink/Downlink (TDD UL/DL) configuration for a first cell using the first RAT. The apparatus also receives a second TDD UL/DL configuration for a second cell using the first RAT. Additionally, the apparatus determines a maximum transmission power for a first transmission using the second RAT based on whether there is a potential overlap between the first transmission using the second RAT and a possible transmission based on the first TDD UL/DL configuration or the second TDD UL/DL configuration during a period of the first transmission or an extended period including the first transmission period.

20 Claims, 17 Drawing Sheets

(51) Int. Cl.
*H04W 72/12* (2009.01)
*H04L 5/14* (2006.01)
*H04W 88/06* (2009.01)

(56) References Cited

U.S. PATENT DOCUMENTS

| | | | |
|---|---|---|---|
| 2016/0029231 A1* | 1/2016 | Kazmi | H04W 72/1226 370/252 |
| 2016/0219546 A1* | 7/2016 | Ahn | H04L 5/00 |
| 2016/0254892 A1* | 9/2016 | Kim | H04W 52/34 370/280 |
| 2018/0279230 A1* | 9/2018 | Yi | H04W 72/0473 |
| 2019/0327743 A1* | 10/2019 | Shi | H04L 5/0087 |

* cited by examiner

INDICATION OF POTENTIAL NR UL TRANSMISSION IN NE-DC

CROSS REFERENCE TO RELATED APPLICATION(S)

This application claims the benefit of U.S. Provisional Application Ser. No. 62/755,385, entitled "Indication of Potential NR UL Transmission in NE-DC" and filed on Nov. 2, 2018, which is expressly incorporated by reference herein in its entirety.

BACKGROUND

Technical Field

The present disclosure relates generally to communication systems, and more particularly, to a communications systems that use multiple radio access technologies (RATs).

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus receives a first Time Division Duplex Uplink/Downlink (TDD UL/DL) configuration for a first cell using a first Radio Access Technology (RAT). The apparatus also receives a second TDD UL/DL configuration for a second cell using the first RAT. Additionally, the apparatus determining a maximum transmission power for a first transmission using a second RAT based on whether there is a potential overlap between the first transmission using the second RAT and a possible transmission based on the first TDD UL/DL configuration or the second TDD UL/DL configuration during a period of the first transmission or an extended period including the first transmission period.

In another aspect of the disclosure, a method, a computer-readable medium, and an apparatus are provided. The apparatus determines a combined TDD UL/DL configuration for a User Equipment (UE) based on a first TDD UL/DL configuration for a first cell using the first RAT and a second TDD UL/DL configuration for a second cell using the first RAT and sends an indication of the combined TDD UL/DL configuration to at least one of the UE and a second base station that uses a second RAT to communicate with the UE.

In another aspect of the disclosure, a method, a computer-readable medium, and an apparatus are provided. The apparatus receives, from a second base station that communicates with a UE using a second RAT, a combined TDD UL/DL configuration for the UE based on a first TDD UL/DL configuration for a first cell using the second RAT and a second TDD UL/DL configuration for a second cell using the second RAT and schedules communication with the UE using the first RAT based on the combined TDD UL/DL configuration received from the second base station.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
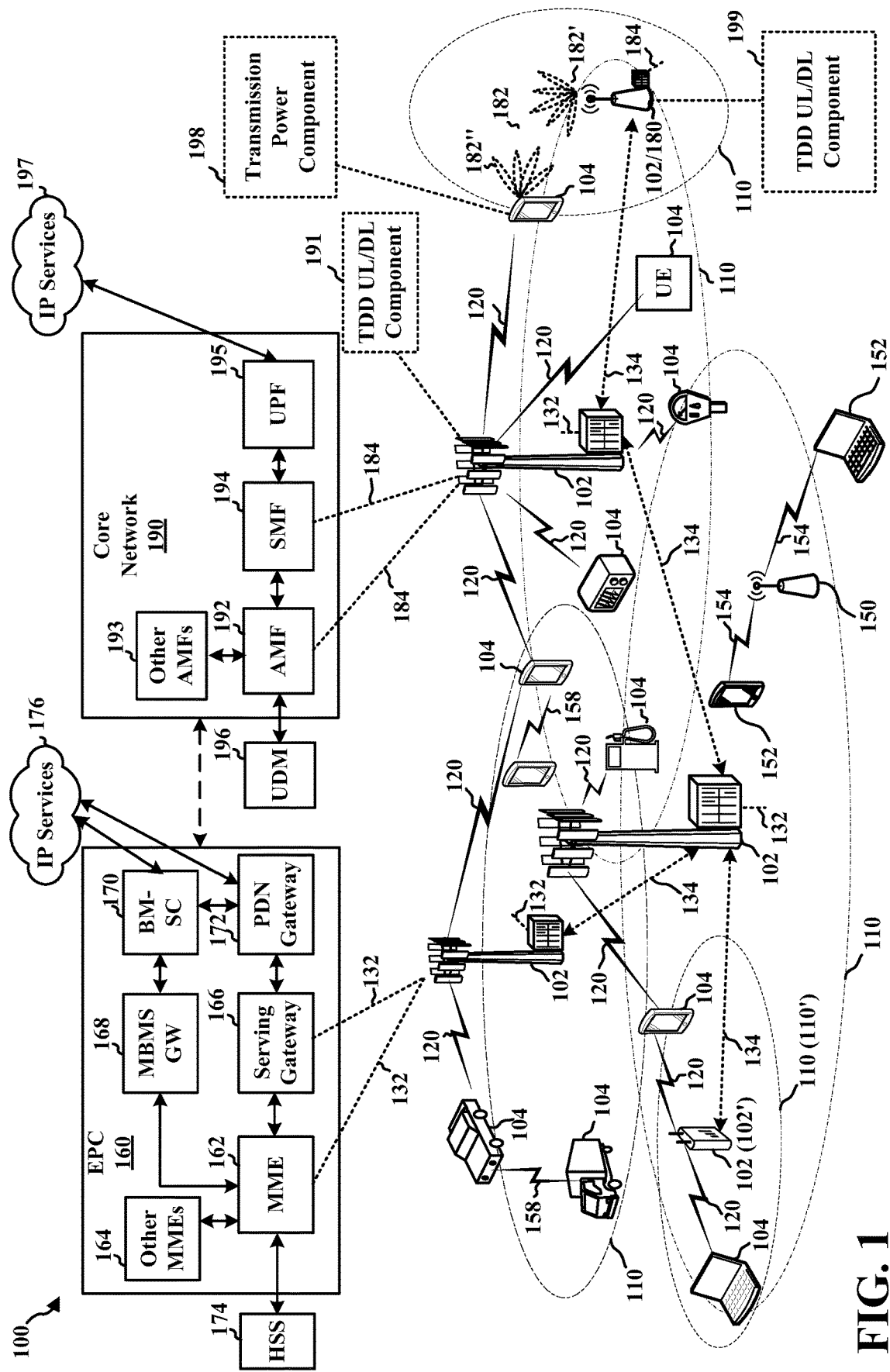
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and a 5G Core (5GC) 190. The base stations 102 may include macro cells (high power cellular base station) and/or small cells (low power cellular base station). The macro cells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell). Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network. A base station 102, whether a small cell 102' or a large cell (e.g., macro base station), may include an eNB, gNodeB (gNB), or other type of base station. Some base stations 180, such as a gNB, may operate in a traditional sub 6 GHz spectrum, in millimeter wave (mmW) frequencies, and/or near mmW frequencies in communication with the UE 104. When the gNB operates in mmW or near mmW frequencies, the gNB may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station, e.g., base station 180, may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the 5GC 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to receive a first TDD UL/DL configuration for a first cell using a first RAT. The apparatus also receives a second TDD UL/DL configuration for a second cell using the first RAT. For example, the UE 104 may receive one TDD UL/DL configuration from a base station 102 and the other TDD UL/DL configuration from a base station 180. Additionally, the UE 104 may include a transmission power component 198 that determines a maximum transmission power for a first transmission using the second RAT based on whether there is a potential overlap between a transmission using the second RAT and a possible transmission based on the first TDD UL/DL configuration or the second TDD UL/DL configuration during a period of the transmission or an extended period including the transmission period. The Base station (such as base station 180) may comprise a TDD UL/DL component 199 configured to determine a combined TDD UL/DL configuration for the UE 104 based on a first TDD UL/DL configuration for a first cell using the first RAT and a second TDD UL/DL configuration for a second cell using the first RAT and to send an indication of the combined TDD UL/DL configuration to at least one of the UE and a second base station (such as base station 102) that uses a second RAT to communicate with the UE. The base station 102 may comprise a TDD UL/DL component 191 configured to receive from base station 180 that communicates with the UE 104 using a second RAT, a combined TDD UL/DL configuration for the UE based on a first TDD UL/DL configuration for a first cell using the second RAT and a second TDD UL/DL configuration for a second cell using the second RAT and to schedule communication with the UE 104 using the first RAT based on the combined TDD UL/DL configuration received from the second base station (such as base station 180). Although aspects of the following description may be provide examples for 5G NR and LTE, the concepts described herein may be applicable to other similar areas, such as LTE-A, CDMA, GSM, and other wireless technologies.

Figure 2:
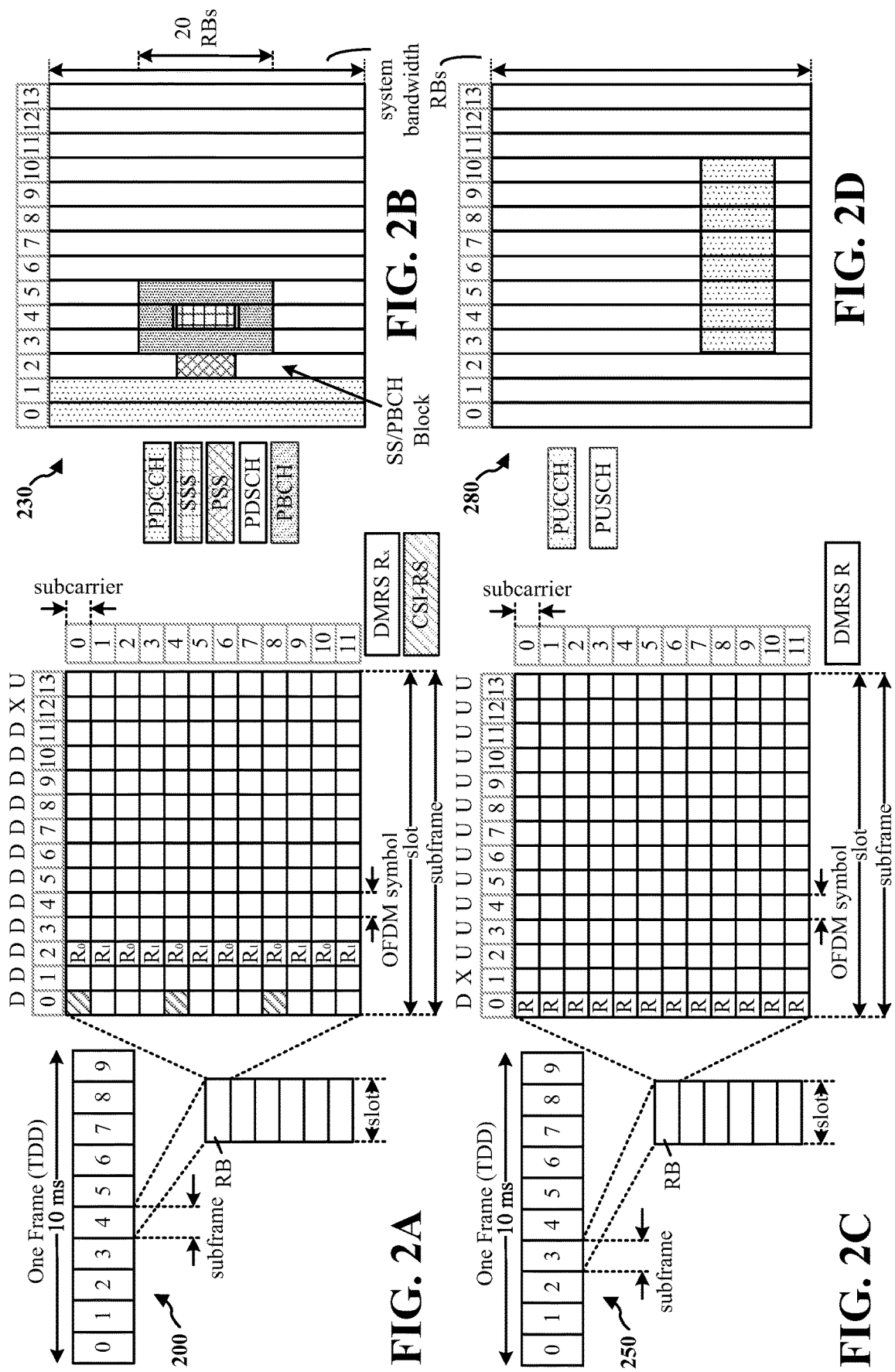
FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu * 15$ kKz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=0$ with 1 slot per subframe. The subcarrier spacing is 15 kHz and symbol duration is approximately 66.7 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where $100x$ is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
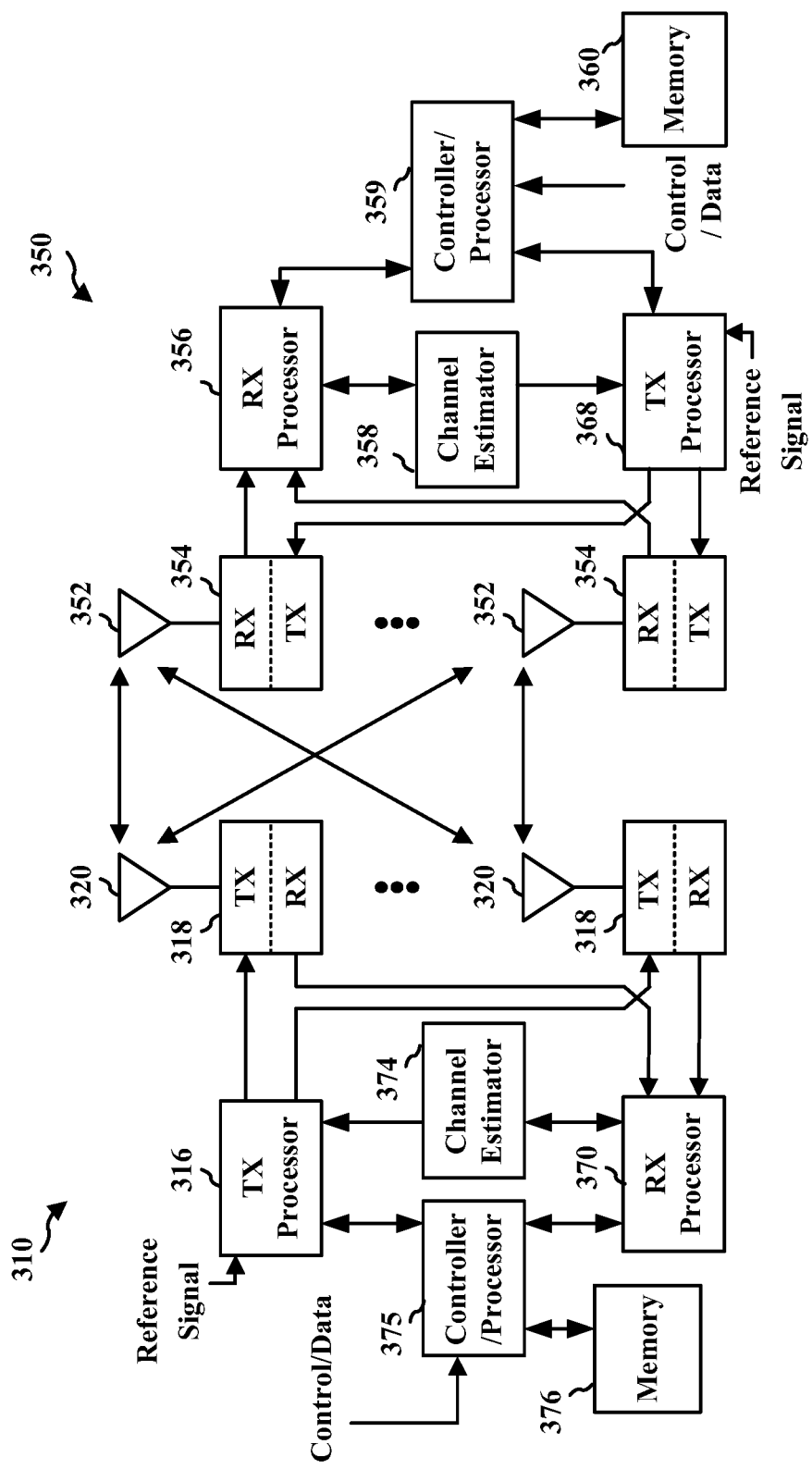
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 191 or 199 of FIG. 1.

A UE may be configured for dual connectivity based on multiple RATs. At times, there may be a possible overlap between resources for the UE to transmit an uplink transmission using one RAT and an uplink transmission using the other RAT. In order to address this potential problem, the UE may determine whether there is a possible overlap and adjust a maximum transmission power of one of the transmissions to account for a potential overlap. For example, the UE may be configured for NR-E-UTRA Dual Connectivity (NE-DC) in which the UE may communicate with a first base station based on LTE and with the other cells based on NR. In order to address potential overlapping uplink resources, the UE may determine whether there is a possible overlap between resources for uplink LTE transmissions and uplink NR transmissions and may adjust a maximum transmission power of the LTE transmission accordingly. For example, a UE may use a first maximum transmit power for an LTE transmission in subframes in which there is a possible overlap with an NR UL transmission and a second, higher transmit power for the LTE transmission in subframes in which there is not a possible overlap.

Figure 4:
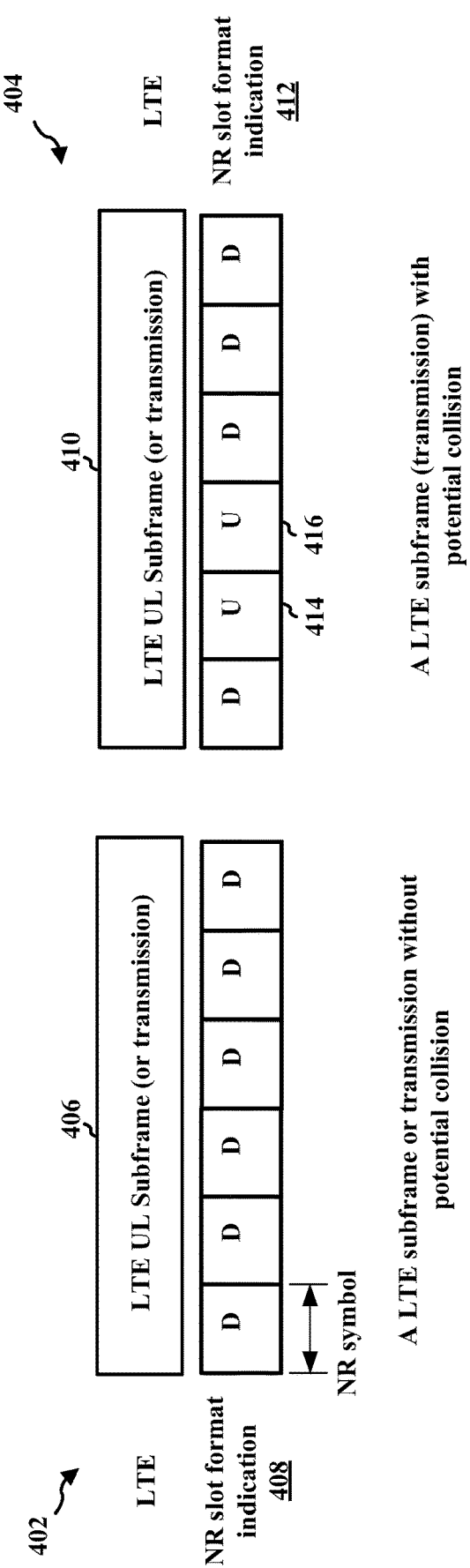
FIG. 4 is a diagram illustrating LTE uplink subframes or transmissions.

FIG. 4 is a diagram illustrating a potential for overlap between LTE uplink transmissions and a TDD UL/DL configuration for NR. The diagram 402 illustrates a portion of an LTE subframe/uplink transmission 406 during which there will be no overlapping NR UL transmissions. There are no overlapping NR transmission because the TDD UL/DL configuration 408 for the symbols that occur at the same time as the LTE subframe/transmission are each configured as DL symbols. In contrast, diagram 404 shows an example LTE subframe or transmission 410 in which there may be an UL transmission during the symbols 414 and 416, because the TDD UL/DL configuration for NR indicates that the symbols 414 and 416 are UL symbols. The UE might not actually transmit an UL transmission during the symbols 414 or 416. However, there is a "potential" or "possible" overlap because the UE might have an UL transmission during one of these UL symbols. Accordingly, the UE may apportion the UE's transmit power between transmissions to the LTE base station and the 5G/NR base station. This may be referred to as dynamic power sharing, e.g., NE-DC dynamic power sharing. With dynamic power sharing, a different maximum transmit power may be used for LTE transmissions in subframes that may have a possible overlap with NR UL/flexible symbol(s) as compared to the transmit power used for LTE transmissions in subframes when there is not an overlap with NR UL/flexible symbol(s). For example, a lower maximum transmit power may be used for LTE transmissions in subframes that have a possible overlap with NR UL/flexible symbol(s) as compared to the transmit power used for LTE transmissions in subframes when there is not an overlap with NR UL/flexible symbol(s). In the example in FIG. 4, the UE may use a lower maximum transmit power to transmit the LTE transmission 410 than for LTE transmission 406, based on the potential for overlapping NR UL transmissions in the symbols 414 and 416.

The UE determine a possible overlap between LTE and NR UL or flexible symbols on a semi-static basis, e.g., the UE may identify potential overlaps at the beginning of a communication. For example, a UE may be configured with a TDD UL/DL configuration for a cell using NR. The TDD UL/DL configuration may be cell specific. The UE may also be configured with a UE-specific TDD UL/DL configuration for LTE communication.

LTE power may be assumed to not vary in a subframe. Accordingly, any subframe that include one or more UL/flexible symbols may use a lower maximum transmit power for the entire subframe or for the entire transmission as compared to the transmit power used for LTE transmissions in subframes when there is not an overlap with NR UL/flexible symbol(s) is supported.

Thus, for the purpose of determining a maximum transmit power, LTE subframes may be classified as two types of subframes, a first type of subframes during which there will be no NR UL transmissions and another type of subframes during which there may be one or more NR UL transmissions due to a TDD UL/DL configuration for NR communication having an UL or flexible symbol during the same period of time. Accordingly, two different maximum power levels may be defined for the LTE UL/flexible transmission depending on whether there is a potential overlap of a possible NR UL transmission. The classifications of LTE subframes, i.e., one set of subframes during which there will be no NR UL transmissions and another set of subframes during which there may be one or more possible NR UL transmissions, may be set on a semi-static basis, such as at the beginning of a communication.

Figure 5:
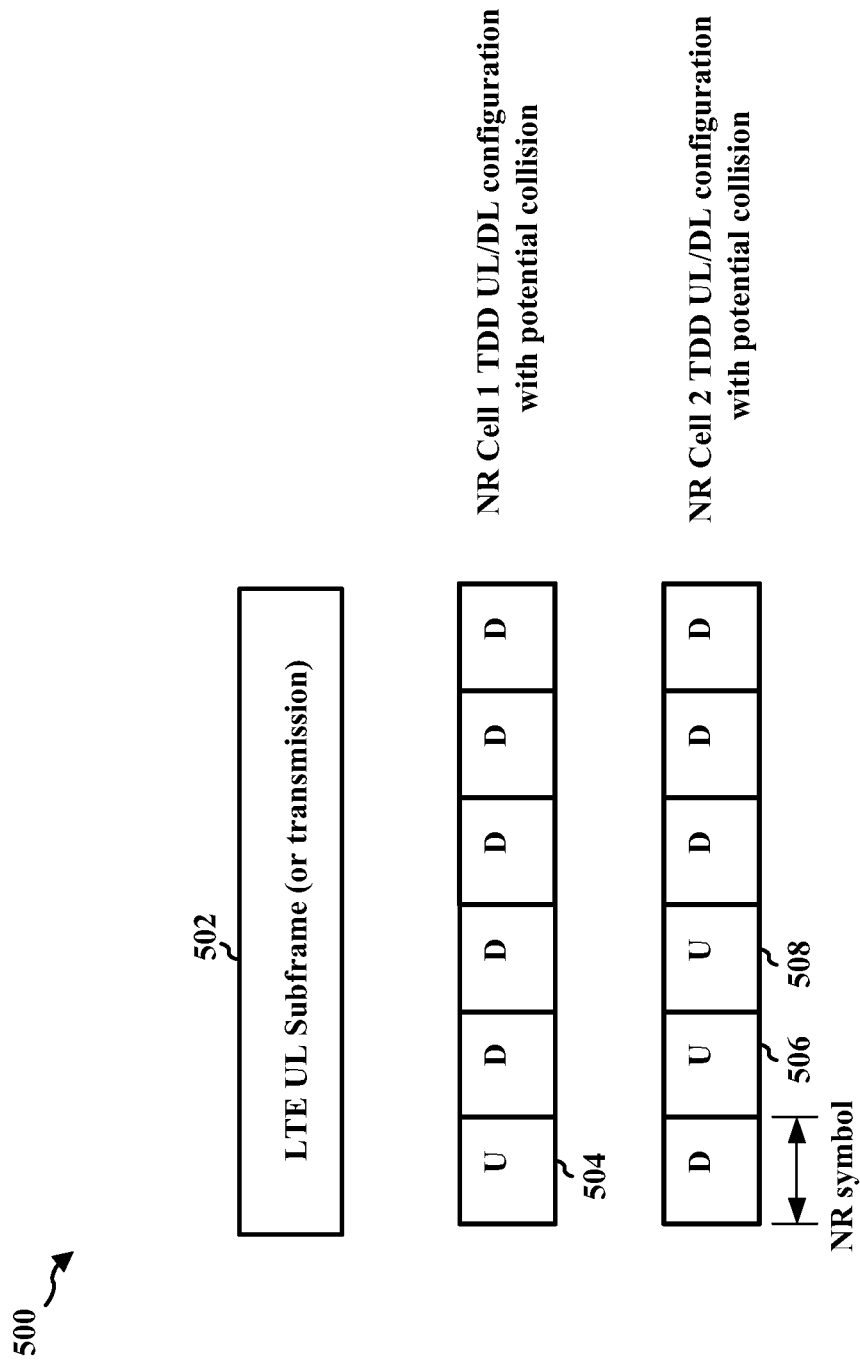
FIG. 5 is a diagram illustrating LTE and New Radio uplink subframes or transmissions.

FIG. 5 is a diagram 500 illustrating an LTE uplink subframe/transmission 502 and a corresponding TDD UL/DL configuration for two different NR cells (e.g., NR Cell 1 and NR Cell 2). A UE may use Carrier Aggregation (CA), and therefore may have TDD UL/DL configurations for multiple cells using NR. As presented herein, the UE may determine whether there is a potential for overlapping between the LTE UL transmission and a possible NR UL transmission for any of the cells for which the UE is configured. A possible overlap may be identified any time at least one symbol from any of the NR cells is configured as UL or flexible and overlaps the LTE subframe/transmission. Accordingly, as illustrated in FIG. 5, both NR Cells 1 and 2 have a potential for overlapping between the LTE transmission and NR communication. The TDD UL/DL configuration for NR Cell 1 includes uplink symbol 504. The TDD UL/DL configuration for NR Cell 2 includes uplink symbols 506 and 508.

In an aspect, a UE may receive a first Time Division Duplex Uplink/Downlink (TDD UL/DL) configuration for a first cell using a first Radio Access Technology (RAT) (e.g., NR cell 1). The UE may receive a second TDD UL/DL configuration for a second cell using the first RAT (e.g., NR cell 2). Additionally, the UE may determine a maximum transmission power for transmitting using a second RAT based on whether there is a potential overlap between a first transmission using the first TDD UL/DL configuration or the second TDD UL/DL configuration first RAT and a second transmission using the second RAT. Although this example only describes two cells, the UE may have configurations for any number of NR cells.

In an aspect, a first maximum transmission power may be used when there is a potential overlap between an LTE transmission/subframe based on the first TDD UL/DL configuration or the second TDD UL/DL configuration. A second maximum transmission power may be used when there is no potential overlap between the LTE transmission and the first TDD UL/DL configuration or the second TDD UL/DL configuration.

In an aspect, the potential overlap occurs when either the first TDD UL/DL configuration or the second TDD UL/DL configuration comprises a symbol configured for uplink transmission or as a flexible symbol.

Figure 6:
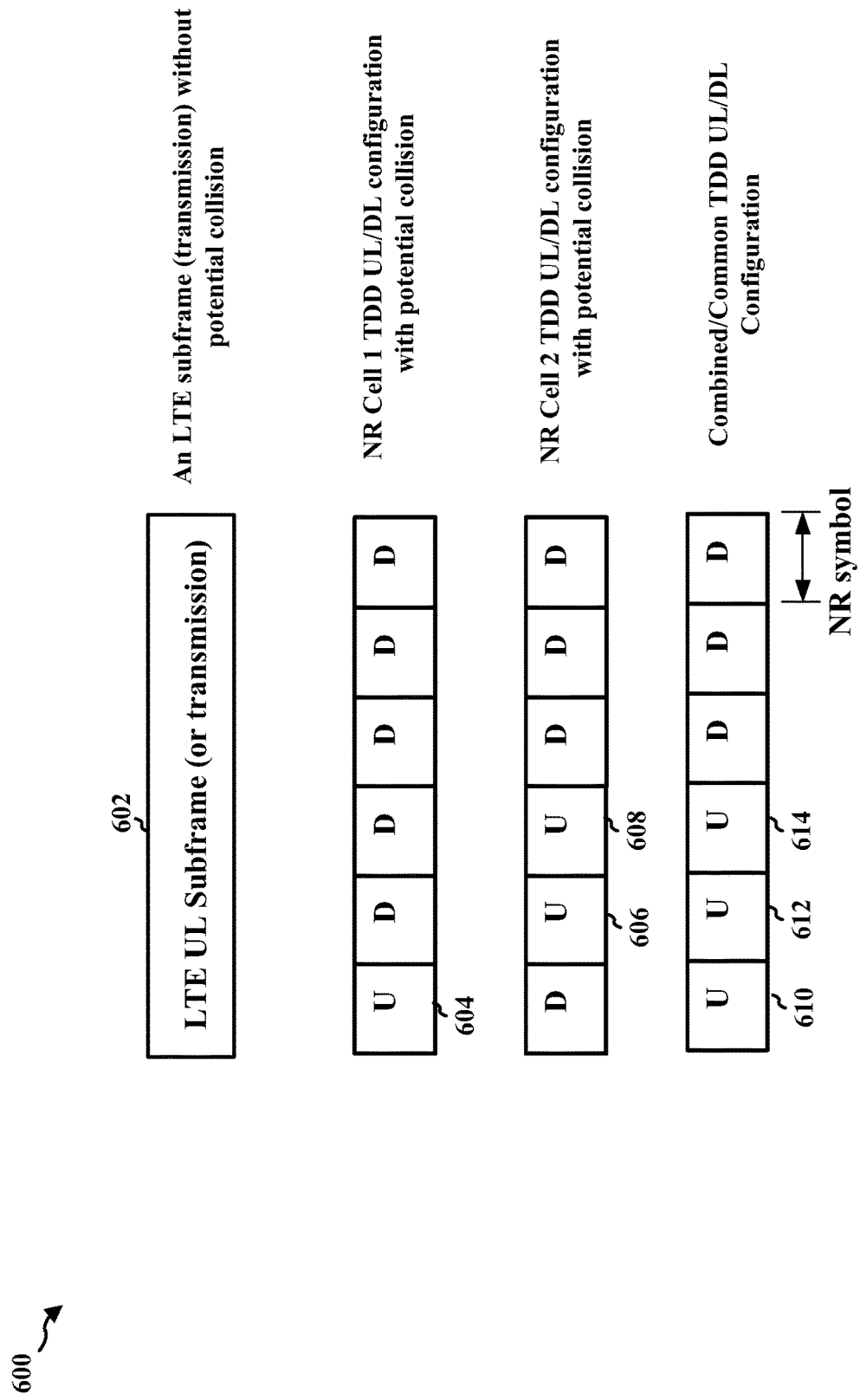
FIG. 6 is a diagram illustrating LTE and New Radio uplink subframes or transmissions and a combined TDD UL/DL Configuration.

FIG. 6 is a diagram 600 illustrating LTE uplink subframe/transmission and a combined TDD UL/DL Configuration based on the TDD UL/DL configurations for two NR cells. The combined TDD UL/DL configuration may also be referred to as a "common" TDD UL/DL configuration for the NR cells. As illustrated in FIG. 6, a new, combined UL/DL configuration may be determined, e.g., for the purpose of determining when there is potential overlapping between LTE transmissions and potential NR transmission opportunities. In an aspect, the combined TDD UL/DL configuration may use a similar format to the individual NR TDD UL/DL configurations for the two NR cells. As illustrated in FIG. 6, if a symbol is UL/flexible in the TDD UL/DL configuration for any of the NR cells with which the UE is configured to communicate, the combined UL/DL configuration will indicate the symbol as UL or flexible. Thus, in FIG. 6, symbol 610 is UL in the combined TDD UL/DL configuration because the NR cell 1 TDD UL/DL configuration has a corresponding UL symbol 604. Likewise, the symbols 612 and 614 are UL in the combined TDD UL/DL configuration because the NR cell 2 TDD UL/DL configuration has the corresponding UL symbols 606 and 608.

Figure 7:
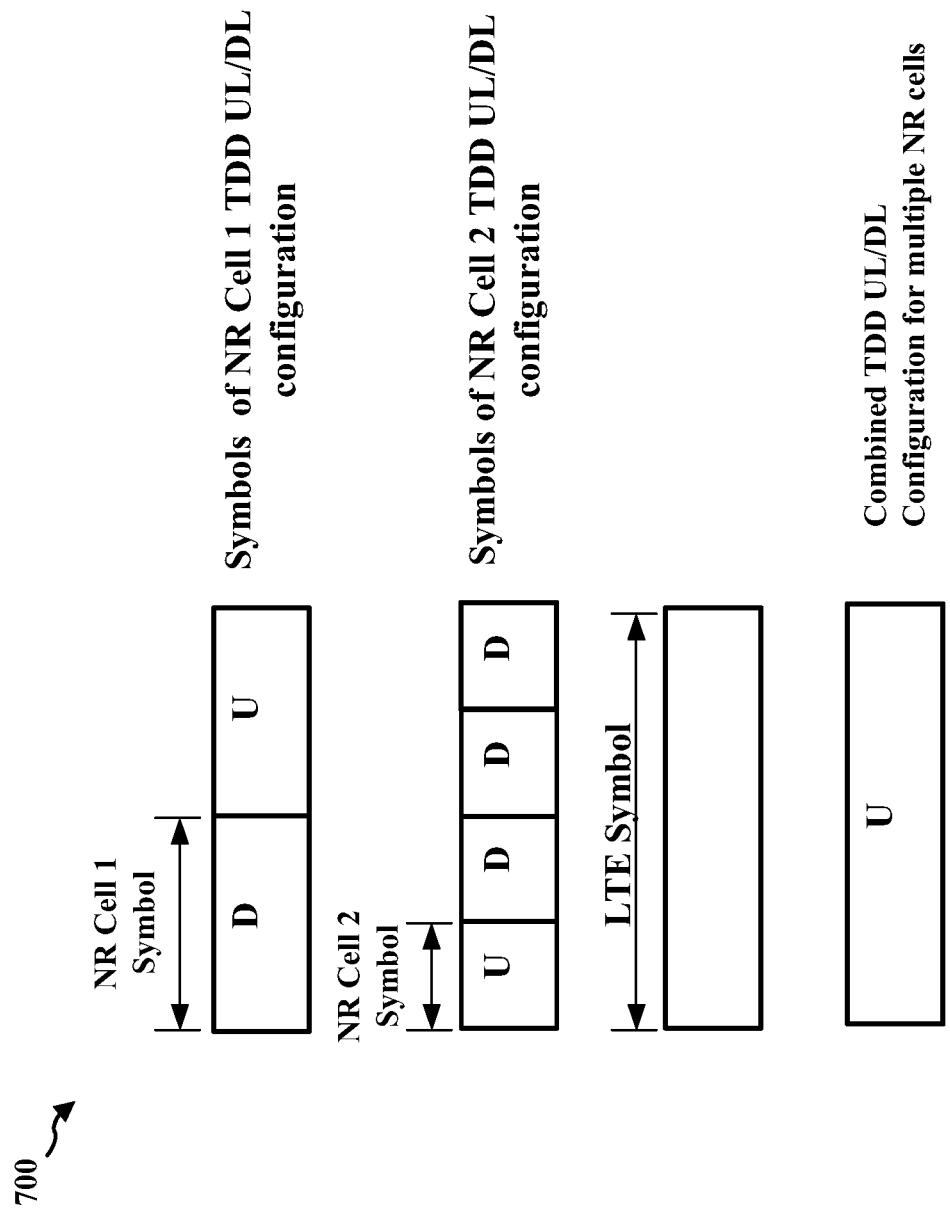
FIG. 7 is a diagram illustrating LTE and variable symbol size New Radio uplink subframes or transmissions and a combined TDD UL/DL Configuration.

The subcarrier spacing, and symbol size, of different NR cells may be different than an LTE subcarrier spacing. FIG. 7 illustrates that the symbols of NR cell 1 might have a longer duration than the symbols of NR cell 2. If a combined TDD UL/DL configuration is based on the symbol size of NR Cell 1, if any of the symbols of NR Cell 2 that overlap the corresponding symbol of NR Cell 1 are UL or flexible, the symbol will designated as UL/flexible in the combined UL/DL configuration. In one example, the UE may determine whether an overlap exists based on a smallest symbol size from among the NR cells. The combined TDD UL/DL configuration may be referred to as a common TDD UL/DL configuration. In another example, the combined TDD UL/DL configuration may be based on an LTE subcarrier spacing or any specified reference subcarrier spacing. As illustrated in FIG. 7, the LTE symbol size may be larger than the NR Cell 1 and/or NR Cell 2 symbol size. If a combined TDD UL/DL configuration is based on the LTE symbol size, if any of the symbols of NR Cell 1 or NR Cell 2 that overlap the corresponding symbol are UL/flexible, the symbol will designated as UL/flexible in the combined UL/DL configuration.

In generating the combined TDD UL/DL configuration, the base station is not limited to configuring a symbol as downlink if none of the cells are configured with an uplink or flexible symbol. The base station may determine to indicate the symbol as an uplink/flexible symbol in the combined TDD UL/DL configuration even when none of the TDD UL/DL configurations for the cells have a corresponding UL/flexible symbol. The base station may flexibly determine whether to indicate that a particular symbol is uplink/flexible, e.g., in order to encourage the LTE base station not to schedule transmissions during the symbol and/or to have the UE reduce the power for transmissions to an LTE base station during the symbol.

The combined TDD UL/DL configuration may be used to determine if there is a potential overlap between UL transmissions for LTE and NR. The determination of a potential overlap may be used to determine an LTE maximal transmit power, as described herein. The UE may use the individual NR cell's UL/DL configuration for the actual transmissions to the respective NR cell. For example, NR UL transmissions may have priority over LTE transmissions, and might not have a limited transmit power. In an aspect, LTE UL transmit power, when an overlap is possible, may be limited to, e.g., about 19 dBm, for example, while NR UL/flexible transmissions may not be so limited.

The UE is not limited to using the combined TDD UL/DL configuration to determine the maximum transmission power for transmitting to an LTE base station. The UE may use the combined TDD UL/DL configuration for other purposes, as well. For example, the UE may be configured for Frequency Division Duplex (FDD) communication with an NR FDD cell. The UE may determine whether or not to transmit to the FDD cell in symbols based on whether the symbol is indicated as being UL or flexible in the combined TDD UL/DL configuration for the other NR cells. Thus, the combined TDD UL/DL configuration may be used by the UE as a Slot Format Indication (SFI) of the UL carriers for NR FDD cells. For example, the UE may determine to transmit to the FDD cell in a symbol in which the combined TDD UL/DL configuration does not indicate an uplink/flexible symbol configuration. If the combined TDD UL/DL configuration does indicate an uplink/flexible symbol, the UE may determine to refrain from transmitting to the FDD cell.

Figure 8:
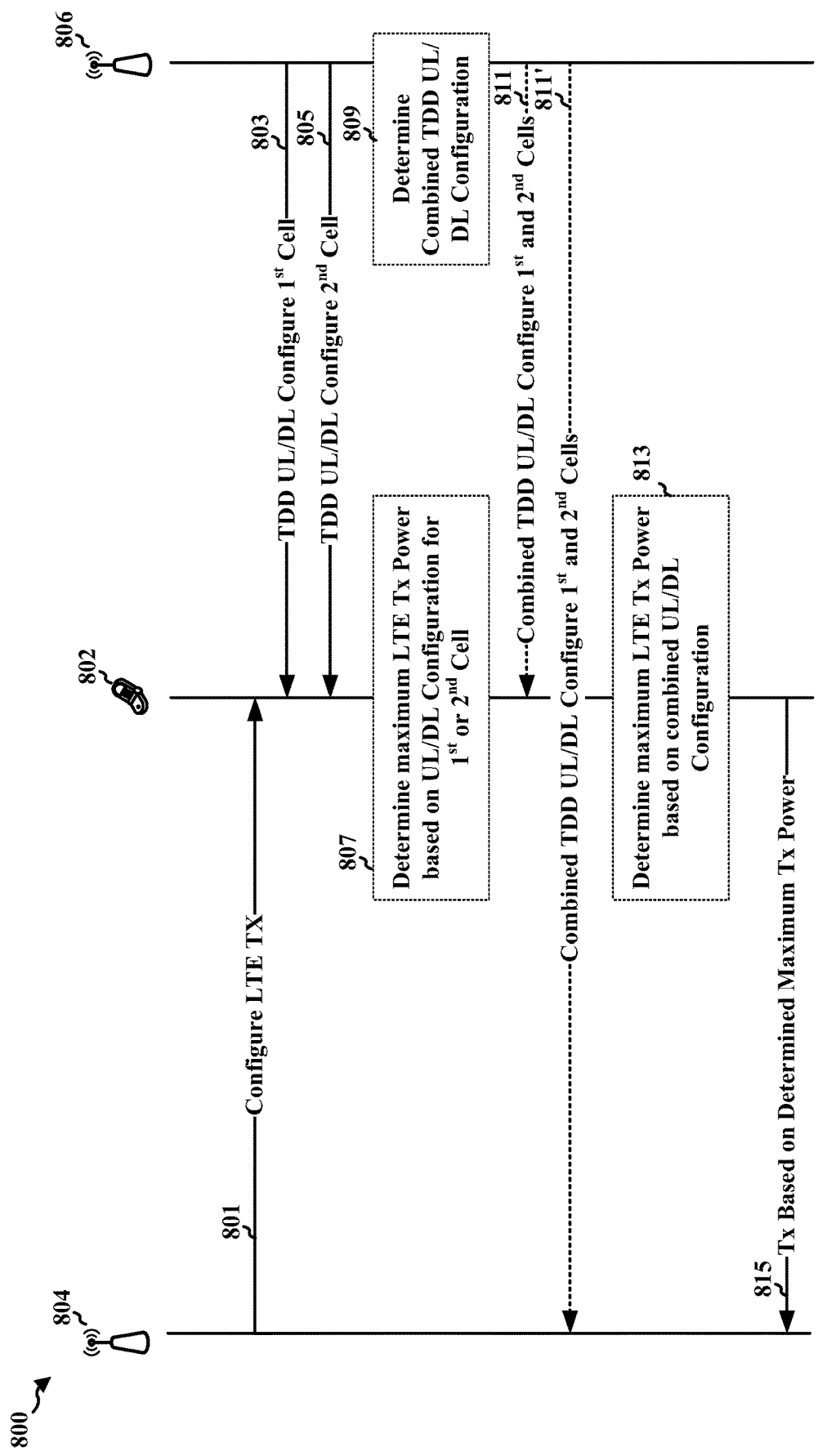
FIG. 8 is a call flow diagram illustrating signal transmissions between a UE and a pair of base stations.

FIG. 8 is a communication flow diagram 800 illustrating signal transmissions between a UE 802 and a pair of base stations using different RATs. For example, the base station 804 may transmit a configuration 801 for LTE communication to the UE 802. The UE 802 may receive the configuration for LTE based communication with the base station 804.

The base station 806 using a second RAT (e.g., NR) may transmit a first TDD UL/DL configuration 803 for a first cell using NR based communication. The UE 802 may receive the first TDD UL/DL configuration for the first cell.

The base station 806 may also transmit second TDD UL/DL configuration 805 for the second cell for communication based on NR. The UE 802 may receive the second TDD UL/DL configuration for the first cell. Although the UE is illustrated as receiving the TDD UL/DL configurations for the two cells from a single base station, the UE may also receive the configuration from different base stations.

The UE 802 may determine, at 807, a maximum LTE Tx Power based on whether there is a potential overlap based on the UL/DL Configuration for either the first cell or the second cell.

The base station 806 may determine, at 809, a combined TDD UL/DL configuration for the UE 802 based on the first TDD UL/DL configuration 803 for the first NR cell and the second TDD UL/DL configuration 805 for the second NR cell. The base station 806 may send an indication of the combined TDD UL/DL configuration 811 to the UE 802 and/or the base station 804 (illustrated as 811'). The base station 804 uses a different RAT than base station 806 to communicate with the UE 802. For example base station 804 may use NR while base station 806 uses LTE. The UE 802 may be configured for NE-DC communication.

The UE 802 and/or the base station 804 may receive the indication of the combined TDD UL/DL configuration 811 or 811'. The UE 802 may determine, at 813, a maximum LTE Tx Power based on the combined UL/DL configuration 811', as described in connection with FIG. 6. The base station 804 may use the information about the potential for NR based UL transmissions from the UE based on the TDD UL/DL configurations of multiple NR cells to schedule the UE for LTE communication. For example, the base station 804 may avoid using symbols for UL communication based on LTE that would potentially overlap with UL transmissions based on NR.

The UE 802 may transmit communication 815 to the base station 804 using a transmission power based on the determined maximum transmit power, e.g., determined at 805 or 807.

Figure 9:
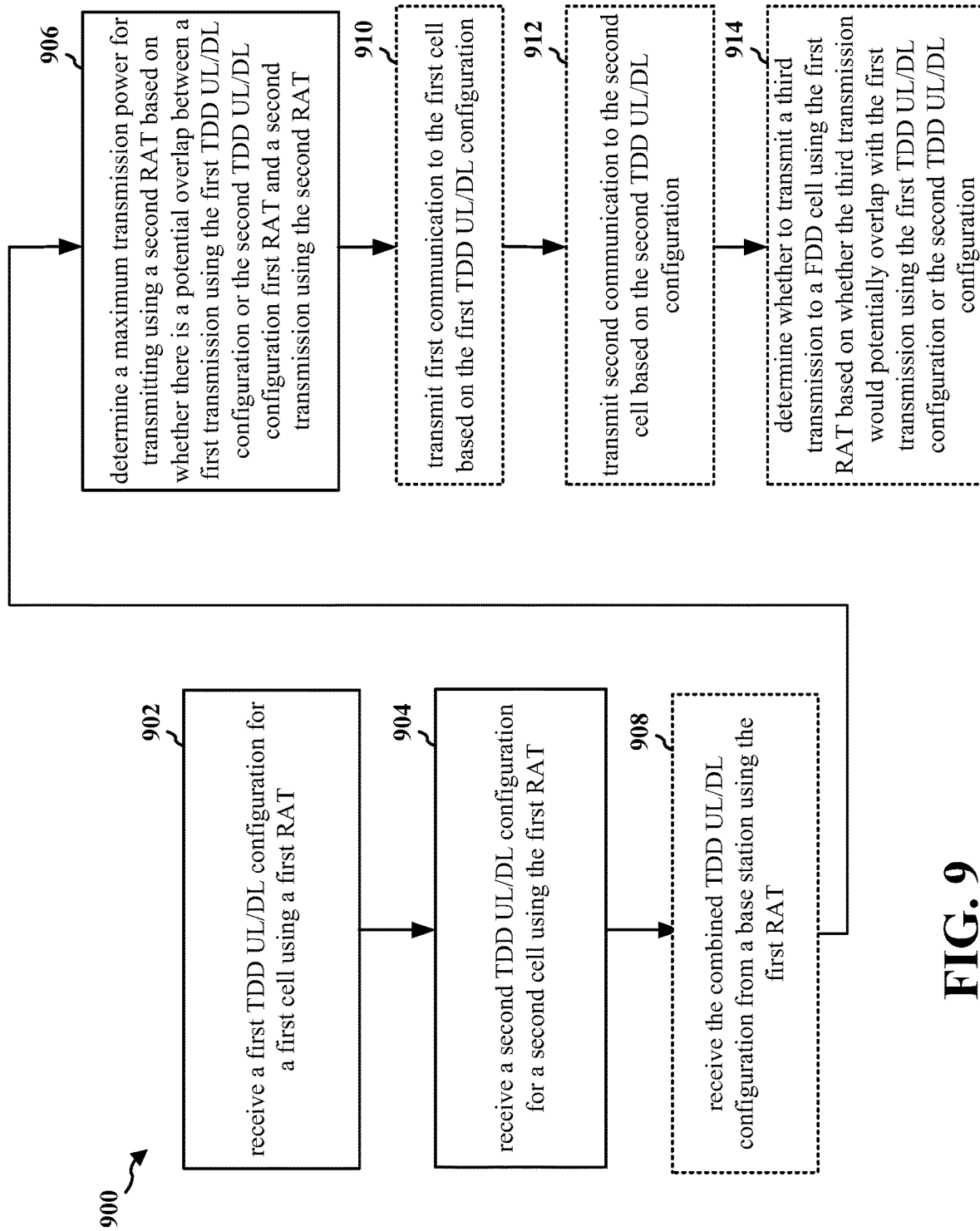
FIG. 9 is a flowchart of a method of wireless communication.

FIG. 9 is a flowchart 900 of a method of wireless communication. The method may be performed by a UE or a component of a UE or a component of a UE (e.g., UE 104, 350, 802; the apparatus 1002/1002'; the processing system 1114, which may include the memory 360 and which may be the entire UE 350 or a component of the UE 350, such as the TX processor 368, the RX processor 356, and/or the controller/processor 359). The UE may be configured to communicate with a first base station using a first Radio Access Technology (RAT) and to communicate with a multiple cell using a second RAT. For example, the UE may be configured for NR-E-UTRA Dual Connectivity (NE-DC). Thus, the UE may communicate with the first base station based on LTE and with the other cells based on NR. Optional aspects are illustrated with a dashed line. The method may enable a UE to determine an appropriate transmission power when it has TDD UL/DL configurations from different cells.

At 902, the UE receives a first TDD UL/DL configuration for a first cell using a first RAT. The reception may be performed, e.g., by the TDD UL/DL configuration component 1008 of the apparatus 1002 in FIG. 10. For example, FIG. 8 illustrates UE 802 receiving a TDD UL/DL configuration for a first cell from base station 806. The TDD UL/DL configuration may indicate whether symbols of a slot can be used for uplink communication or downlink communication. The TDD UL/DL configuration may be cell specific for the first cell.

At 904, the UE receives a second TDD UL/DL configuration for a second cell using the first RAT. The reception may be performed, e.g., by the TDD UL/DL configuration component 1008 of the apparatus 1002 in FIG. 10. For example, FIG. 8 also illustrates UE 802 receiving a TDD UL/DL configuration for a second cell from base station 806. The UE may use the TDD UL/DL configurations for communication based on carrier aggregation. Although only two TDD UL/DL configurations are illustrated in FIGS. 8 and 9, this is merely an example to show the principle of a UE receiving multiple TDD UL/DL configurations for different cells. The UE may have received any number of TDD UL/DL configurations for any number of cells. Also, although FIG. 8 illustrates the UE receiving the two TDD UL/DL configurations from a single base station, the UE may also receive the configurations from different base stations using the second RAT.

At 908, the UE determines a maximum transmission power for a first transmission using a second RAT based on whether there is a potential overlap between the first transmission using the second RAT and a possible transmission based on the first TDD UL/DL configuration or the second TDD UL/DL configuration during a period including the first transmission. The period may correspond to a period of the first transmission or may correspond to an extended period that includes the first transmission. The determination may be performed, e.g., by the transmission power component 1010 of the apparatus 1002 in FIG. 10. For example, a first (e.g., lower) maximum transmission power may be used when there is a potential overlap between the first transmission using the second RAT and the possible transmission based on the first TDD UL/DL configuration or the second TDD UL/DL configuration, and a second (e.g., higher) maximum transmission power may be used when there is no potential overlap between the first transmission using the second RAT and the possible transmission based on the first TDD UL/DL configuration or the second TDD UL/DL configuration.

The potential overlap occurs when either the first TDD UL/DL configuration or the second TDD UL/DL configuration comprises a symbol configured for uplink transmission or as a flexible symbol, as described in connection with FIGS. 5-7.

The UE may use a combined TDD UL/DL configuration based on the first TDD UL/DL configuration and the second TDD UL/DL configuration to determine whether there is the potential overlap with the first transmission using the second RAT, e.g., as described in connection with FIGS. 6 and 7. As illustrated at 906, the UE may receive the combined TDD UL/DL configuration from a base station using the first RAT. The reception may be performed, e.g., by the TDD UL/DL configuration component 1008 of the apparatus 1002 in FIG. 10. A symbol of the combined TDD UL/DL configuration may be configured as an uplink symbol or a flexible symbol when a corresponding symbol of either the first TDD UL/DL configuration or the second TDD UL/DL configuration is configured for the uplink symbol or the flexible symbol. The subcarrier spacing, and symbol size, of the TDD UL/DL configurations for the first and second cell may be different and may also be different from a subcarrier spacing used for the second RAT. Thus, the combined TDD UL/DL configuration may be based on a subcarrier spacing of the second RAT or based on a predefined, reference subcarrier spacing.

As illustrated at 910, the UE may transmit a second transmission to the first cell based on the first TDD UL/DL configuration. The second transmission may be performed, e.g., by the first RAT component 1014 of the apparatus 1002 in FIG. 10. As illustrated at 912, the UE may transmit a third transmission to the second cell based on the second TDD UL/DL configuration. The third transmission may be performed, e.g., by the first RAT component 1014 of the apparatus 1002 in FIG. 10. Thus, the UE may use the first and second TDD UL/DL configurations for communicating with the first and second cells, respectively. The combined TDD UL/DL configuration may be used instead for determining the maximum transmission power for communication based on the second RAT. As well, as illustrated at 914, the method may further include transmitting the first transmitting the first transmission using a transmission power based on the determined maximum transmission power from 908.

As an additional example, the UE may determine, at 914, whether to transmit a third transmission to an FDD cell using the first RAT based on whether the third transmission would potentially overlap with the potential transmission based on the first TDD UL/DL configuration or the second TDD UL/DL configuration. The determination may be performed, e.g., by the first RAT component 1014 of the apparatus 1002 in FIG. 10. Similar to the determination regarding the maximum transmission power at 908, the UE may transmit to the FDD cell using the first RAT when the third transmission would not potentially overlap with the potential transmission based on the first TDD UL/DL configuration or the second TDD UL/DL configuration, and the UE may refrain from transmitting to the FDD cell using the first RAT when the third transmission would potentially overlap with the potential transmission based on the first TDD UL/DL configuration or the second TDD UL/DL configuration.

Figure 10:
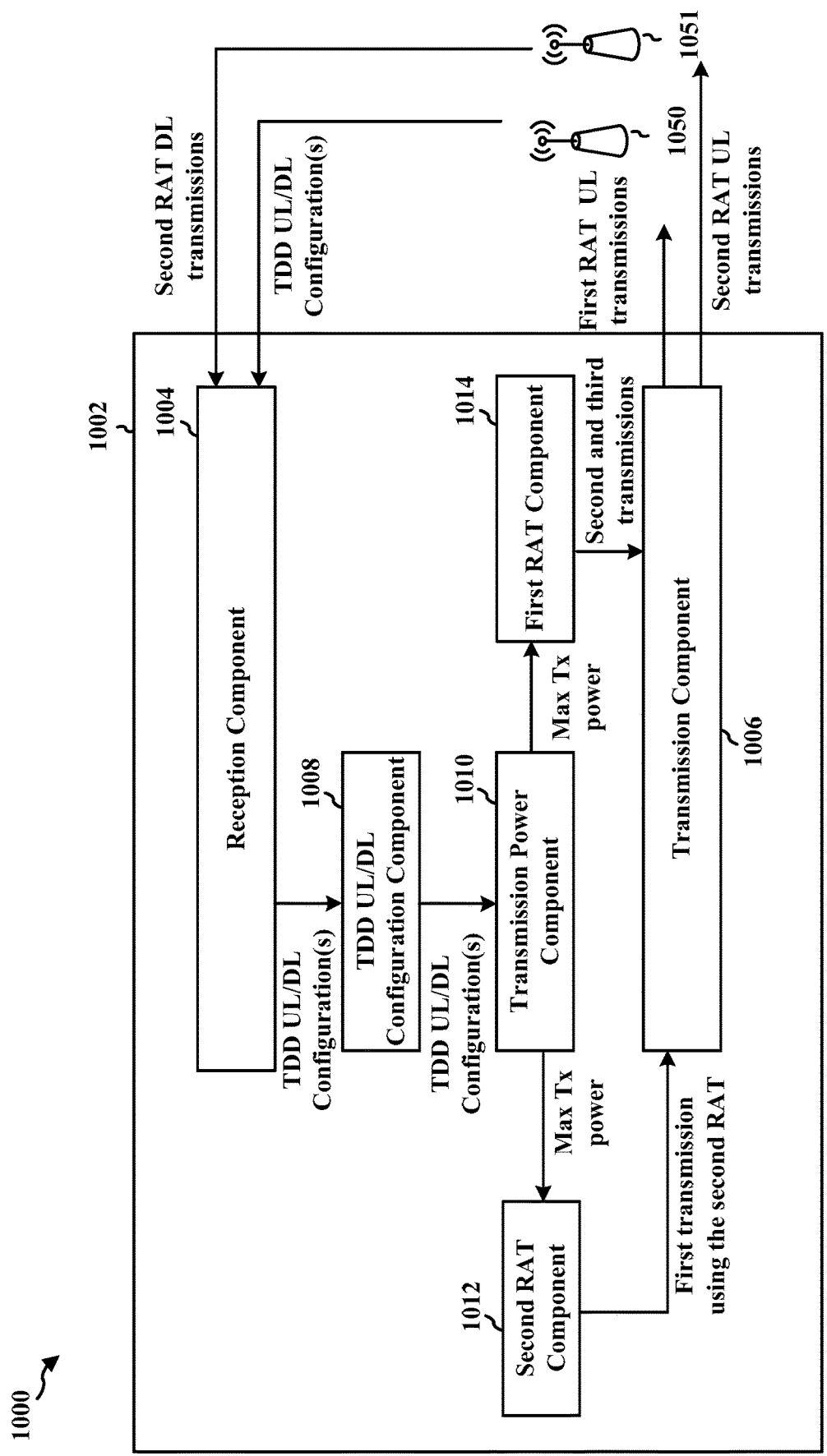
FIG. 10 is a conceptual data flow diagram illustrating the data flow between different means/components in an example apparatus.

FIG. 10 is a conceptual data flow diagram 1000 illustrating the data flow between different means/components in an example apparatus 1002. The apparatus may be a UE or a component of a UE. The apparatus 1002 may include a reception component 1004 configured to receive downlink communication from a base station 1050 using a first RAT and a base station 1051 using a second RAT. The apparatus may include a TDD UL/DL configuration component 1008 configured to receive a first TDD UL/DL configuration for a first cell using a first RAT, receive a second TDD UL/DL configuration for a second cell using the first RAT, and/or receive a combined TDD UL/DL configuration, e.g., as described in connection with 902, 904, and/or 908 in FIG. 9. The apparatus includes a transmission power component 1010 configured to determine maximum transmission power for a first transmission using a second RAT based on whether there is a potential overlap between the first transmission using the second RAT and a possible transmission based on the first TDD UL/DL configuration or the second TDD UL/DL configuration during a period including the first transmission, e.g., as described in connection with 906 in FIG. 9. The apparatus may include a second RAT component 1012 configured to communicate with the base station 1051 using a second RAT, e.g., as described in connection with 912 and/or 914 of FIG. 9. The apparatus may include a first RAT component 1014 configured to communicate with the base station 1050 using a first RAT, e.g., as described in connection with 910 of FIG. 9.

The apparatus may include additional components that perform each of the blocks of the algorithm in the aforementioned flowchart of FIG. 9, and aspects performed by the UE 802 in FIG. 8. As such, each block in the aforementioned flowchart of FIG. 9, and aspects performed by the UE 802 in FIG. 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 11:
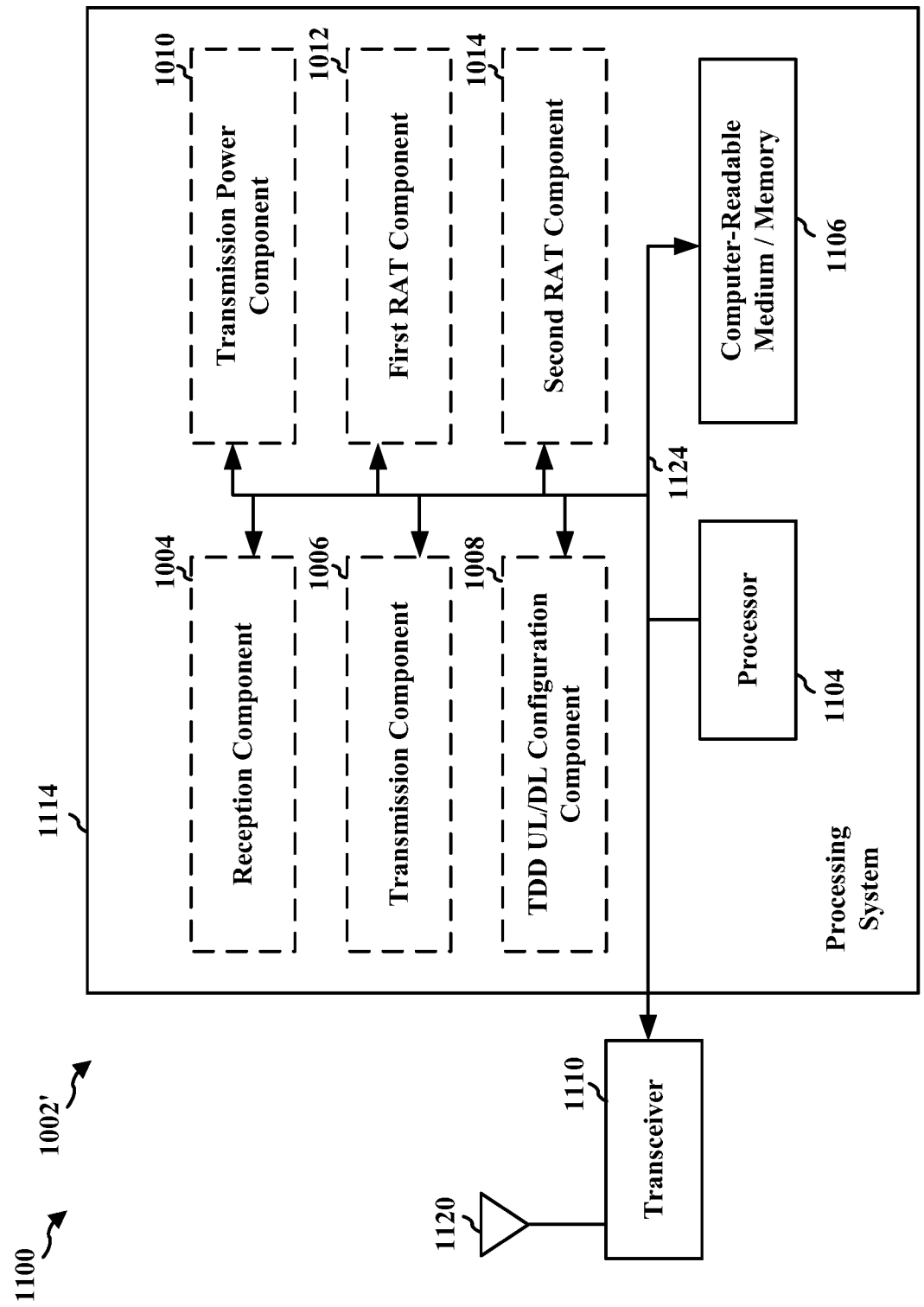
FIG. 11 is a diagram illustrating an example of a hardware implementation for an apparatus employing a processing system.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware components, represented by the processor 1104, the components 1004, 1006, 1008, 1010, 1012, 1014, and the computer-readable medium/memory 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114, specifically the reception component 1004. In addition, the transceiver 1110 receives information from the processing system 1114, specifically the transmission component 1006, and based on the received information, generates a signal to be applied to the one or more antennas 1120. The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system 1114 further includes at least one of the components 1004, 1006, 1008, 1010, 1012, 1014. The components may be software components running in the processor 1104, resident/stored in the computer readable medium/memory 1106, one or more hardware components coupled to the processor 1104, or some combination thereof. The processing system 1114 may be a component of the UE 350 and may include the memory 360 and/or at least one of the TX processor 368, the RX processor 356, and the controller/processor 359. Alternatively, the processing system 1114 may be the entire UE (e.g., see 350 of FIG. 3).

In one configuration, the apparatus 1002/1002' for wireless communication includes means for receiving a first TDD UL/DL configuration for a first cell using a first RAT; means for receiving a second TDD UL/DL configuration for a second cell using the first RAT, and means for determining a maximum transmission power for a first transmission using a second RAT based on whether there is a potential overlap between the first transmission using the second RAT and a possible transmission based on the first TDD UL/DL configuration or the second TDD UL/DL configuration during a period including the first transmission. The apparatus may further include means for receiving the combined TDD UL/DL configuration from a base station using the first RAT. The apparatus may further include means for transmitting a second transmission to the first cell based on the first TDD UL/DL configuration. The apparatus may further include means for transmitting a third transmission to the second cell based on the second TDD UL/DL configuration. The apparatus may further include means for determining whether to transmit a third transmission to a FDD cell using the first RAT based on whether the third transmission would potentially overlap with the possible transmission based on the first TDD UL/DL configuration or the second TDD UL/DL configuration. The aforementioned means may be one or more of the aforementioned components of the apparatus 1002 and/or the processing system 1114 of the apparatus 1002' configured to perform the functions recited by the aforementioned means. As described supra, the processing system 1114 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 12:
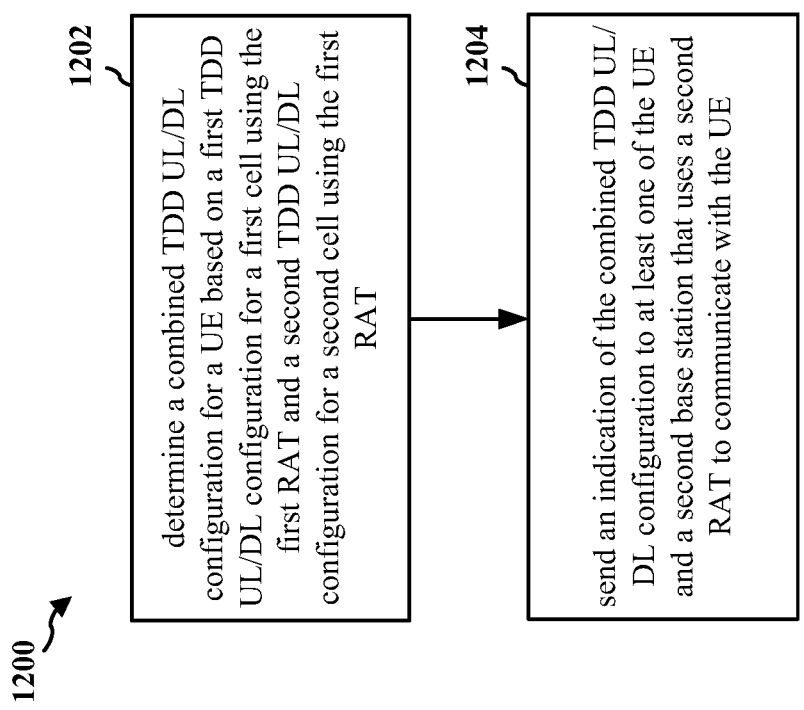
FIG. 12 is a flowchart of a method of wireless communication.

FIG. 12 is a flowchart 1200 of a method of wireless communication. The method may be performed by a base station or a component of a base station (e.g., base station 180, 310, 806; the apparatus 1302/1302'; the processing system 1414, which may include the memory 376 and which may be the entire base station 310 or a component of the base station 310, such as the TX processor 316, the RX processor 370, and/or the controller/processor 375). The base station may be configured to communicate with a UE (e.g., UE 802) using a first RAT. For example, the UE may be configured for NE-DC, and the base station may comprise a gNB or other base station using NR. The method may enable a UE to determine an appropriate transmission power when it has TDD UL/DL configurations from different cells and may further improve the scheduling of the UE by a base station using a second RAT.

At 1202, the base station determines a combined TDD UL/DL configuration for a UE based on a first TDD UL/DL configuration for a first cell using the first RAT and a second TDD UL/DL configuration for a second cell using the first RAT. The determination may be performed, e.g., by the combined TDD UL/DL configuration component 1308 of the apparatus 1302 in FIG. 13. The UE may be configured for CA using multiple cells. The determination may be based on the aspects described in connection with FIGS. 6 and 7. For example, a symbol of the combined TDD UL/DL configuration is configured as an uplink symbol or a flexible symbol when a corresponding symbol of either the first TDD UL/DL configuration or the second TDD UL/DL configuration is configured for the uplink symbol or the flexible symbol. As well, the subcarrier spacing, and symbol size, of the TDD UL/DL configurations for the first and second cell may be different and may also be different from a subcarrier spacing used for the second RAT. Thus, the combined TDD UL/DL configuration may be based on a subcarrier spacing of the second RAT or based on a predefined, reference subcarrier spacing.

At 1204, the base station may send an indication of the combined TDD UL/DL configuration to at least one of the UE and a second base station that uses a second RAT (e.g., LTE) to communicate with the UE. The indication may be sent, e.g., by the transmission component 1306 of the apparatus 1302 in FIG. 13. As described in connection with FIG. 8, the base station may send the TDD UL/DL configuration to both the UE and the LTE base station. In another example, the base station may send the TDD UL/DL configuration only to the UE. In another example, the base station may send the TDD UL/DL configuration only to the base station.

Figure 13:
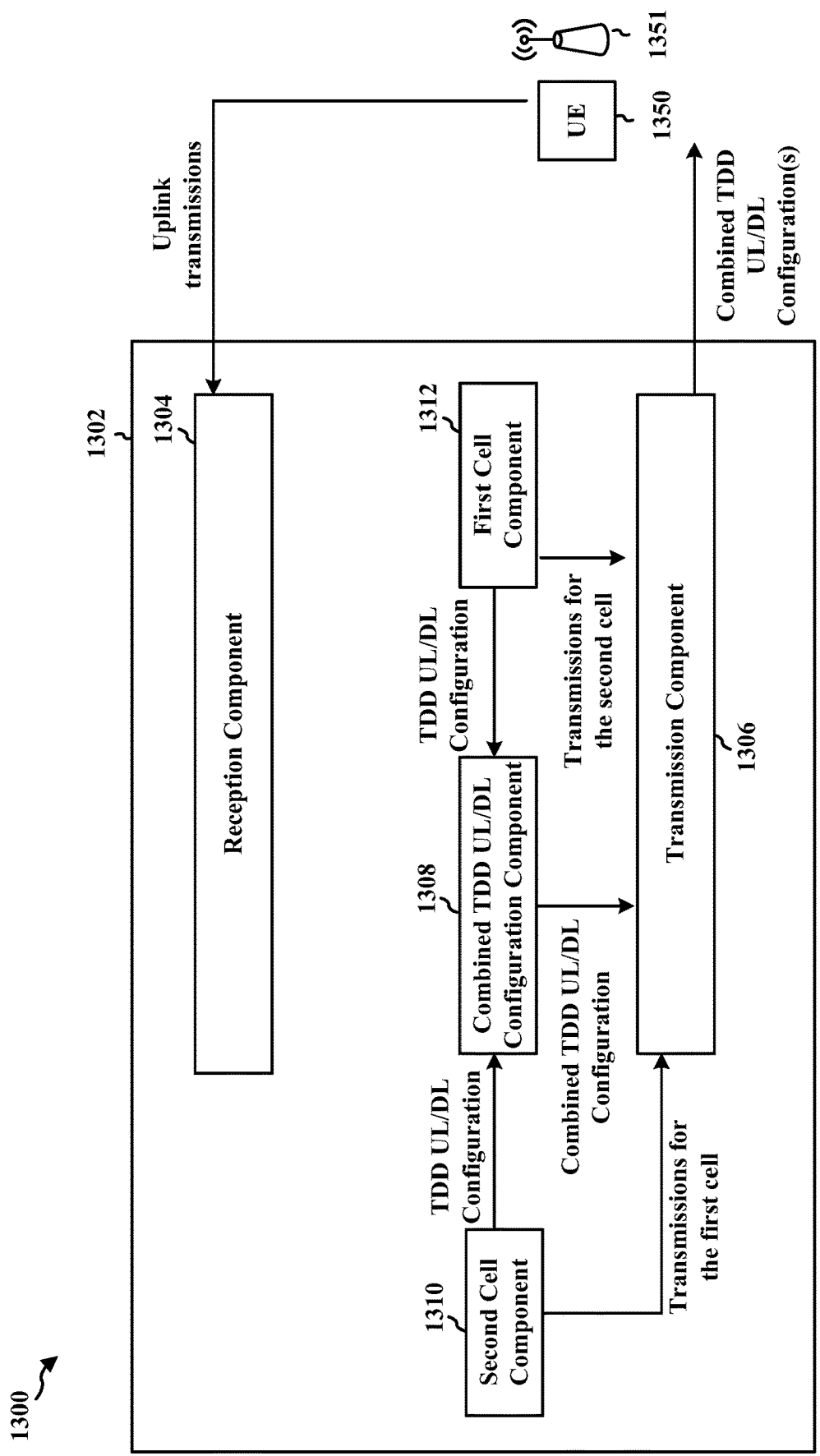
FIG. 13 is a conceptual data flow diagram illustrating the data flow between different means/components in an example apparatus.

FIG. 13 is a conceptual data flow diagram 1300 illustrating the data flow between different means/components in an example apparatus 1302. The apparatus may be a base station or a component of a base station. The apparatus includes a reception component 1304 that receives uplink communication from at least one UE 1350 and a transmission component 1306 that transmits downlink communication to the UE 1350. The apparatus includes a combined TDD UL/DL configuration component configured to determine a combined TDD UL/DL configuration for a UE based on a first TDD UL/DL configuration for a first cell using the first RAT (e.g., from first cell component 1310) and a second TDD UL/DL configuration for a second cell using the first RAT (e.g., from second cell component 1312), e.g., as described in connection with 1202 in FIG. 12. Although illustrated as a component of the apparatus 1302, the second cell component 1312 may be external to the apparatus 1302 and may the second cell may be for a different base station. The transmission component 1306 may be configured to send an indication of the combined TDD UL/DL configuration to at least one of the UE 1350 and a second base station 1351 that uses a second RAT to communicate with the UE, e.g., as described in connection with 1204 in FIG. 12.

The apparatus may include additional components that perform each of the blocks of the algorithm in the aforementioned flowchart of FIG. 12 and aspects performed by the base station 806 in FIG. 8. As such, each block in the aforementioned flowchart of FIG. 12 and aspects performed by the base station 806 in FIG. 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 14:
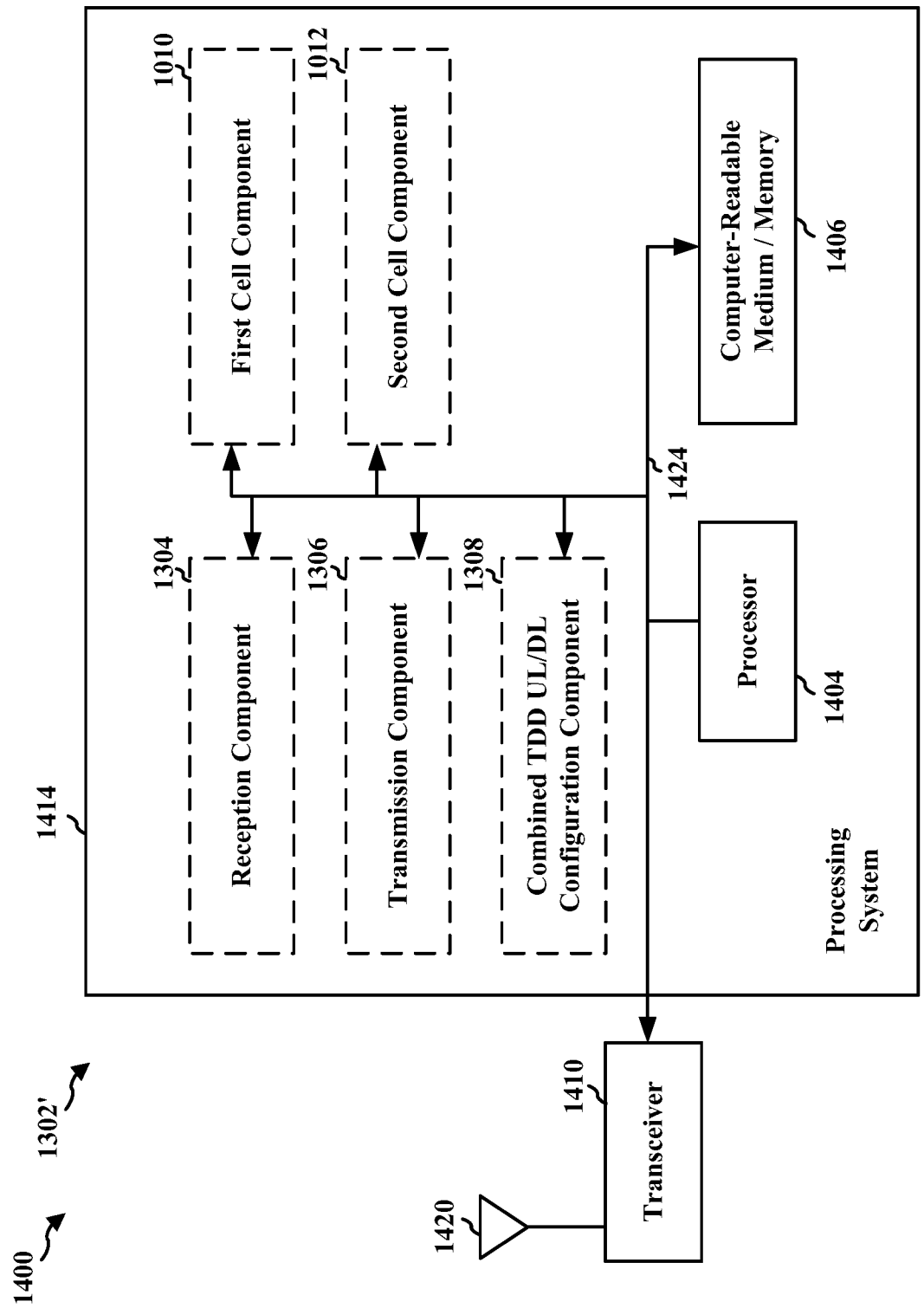
FIG. 14 is a diagram illustrating an example of a hardware implementation for an apparatus employing a processing system.

FIG. 14 is a diagram 1400 illustrating an example of a hardware implementation for an apparatus 1302' employing a processing system 1414. The processing system 1414 may be implemented with a bus architecture, represented generally by the bus 1424. The bus 1424 may include any number of interconnecting buses and bridges depending on the specific application of the processing system 1414 and the overall design constraints. The bus 1424 links together various circuits including one or more processors and/or hardware components, represented by the processor 1404, the components 1304, 1306, 1308, 1310, 1312, and the computer-readable medium/memory 1406. The bus 1424 may also link various other circuits such as timing sources, peripherals, voltage regulators, and power management circuits, which are well known in the art, and therefore, will not be described any further.

The processing system 1414 may be coupled to a transceiver 1410. The transceiver 1410 is coupled to one or more antennas 1420. The transceiver 1410 provides a means for communicating with various other apparatus over a transmission medium. The transceiver 1410 receives a signal from the one or more antennas 1420, extracts information from the received signal, and provides the extracted information to the processing system 1414, specifically the reception component 1304. In addition, the transceiver 1410 receives information from the processing system 1414, specifically the transmission component 1306, and based on the received information, generates a signal to be applied to the one or more antennas 1420. The processing system 1414 includes a processor 1404 coupled to a computer-readable medium/memory 1406. The processor 1404 is responsible for general processing, including the execution of software stored on the computer-readable medium/memory 1406. The software, when executed by the processor 1404, causes the processing system 1414 to perform the various functions described supra for any particular apparatus. The computer-readable medium/memory 1406 may also be used for storing data that is manipulated by the processor 1404 when executing software. The processing system 1414 further includes at least one of the components 1304, 1306, 1308, 1310, 1312. The components may be software components running in the processor 1404, resident/stored in the computer readable medium/memory 1406, one or more hardware components coupled to the processor 1404, or some combination thereof. The processing system 1414 may be a component of the base station 310 and may include the memory 376 and/or at least one of the TX processor 316, the RX processor 370, and the controller/processor 375. Alternatively, the processing system 1414 may be the entire base station (e.g., see 310 of FIG. 3).

In one configuration, the apparatus 1302/1302' for wireless communication includes means for determining a combined TDD UL/DL configuration for a UE based on a first TDD UL/DL configuration for a first cell using the first RAT and a second TDD UL/DL configuration for a second cell using the first RAT, and means for sending an indication of the combined TDD UL/DL configuration to at least one of the UE and a second base station that uses a second RAT to communicate with the UE. The aforementioned means may be one or more of the aforementioned components of the apparatus 1302 and/or the processing system 1414 of the apparatus 1302' configured to perform the functions recited by the aforementioned means. As described supra, the processing system 1414 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 15:
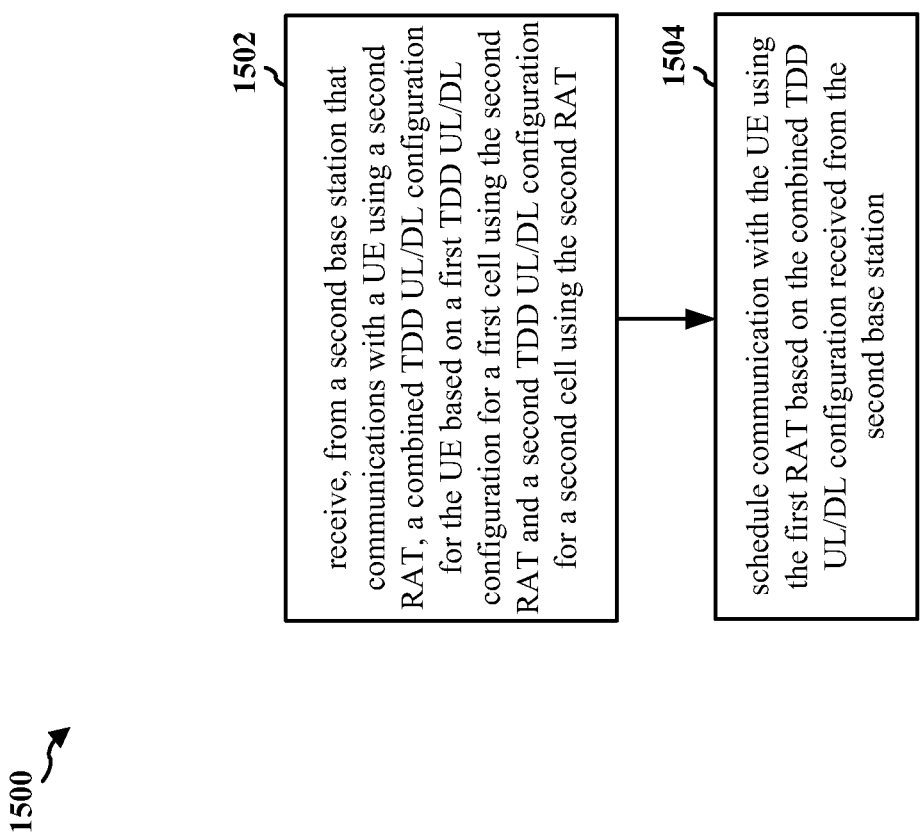
FIG. 15 is a flowchart of a method of wireless communication.

FIG. 15 is a flowchart 1500 of a method of wireless communication. The method may be performed by a base station or a component of a base station (e.g., base station 102, 310, 804 the apparatus 1602/1602'; the processing system 1714, which may include the memory 376 and which may be the entire base station 310 or a component of the base station 310, such as the TX processor 316, the RX processor 370, and/or the controller/processor 375). The base station may be configured to communicate with a UE (e.g., UE 802) using a first Radio Access Technology (RAT). For example, the UE may be configured for NE-DC, and the base station may communicate with the UE using LTE. The method may improve the scheduling of the UE by the base station in a way that avoids overlapping configurations for the UE to transmit using multiple RATs.

At 1502, the base station receives, from a second base station that communicates with a UE using a second RAT (e.g., NR), a combined TDD UL/DL configuration for the UE based on a first TDD UL/DL configuration for a first cell using the second RAT and a second TDD UL/DL configuration for a second cell using the second RAT. The reception may be performed, e.g., by the combined TDD UL/DL configuration component 1608 of the apparatus 1602 in FIG. 16. FIG. 8 illustrates an example of base station 804 receiving a combined TDD UL/DL configuration from the base station 806.

At 1504, the base station schedules communication with the UE using the first RAT based on the combined TDD UL/DL configuration received from the second base station. The scheduling may be performed, e.g., by the schedule component 1610 of the apparatus 1602 in FIG. 16. For example, the base station may avoid configuring the UE for transmissions that would overlap with potential uplink transmissions based on the combined TDD UL/DL configuration for the second RAT. The first base station may schedule uplink communication from the UE using resources that do not overlap with a symbol that is indicated as uplink or flexible in the combined TDD UL/DL configuration received from the second base station.

Figure 16:
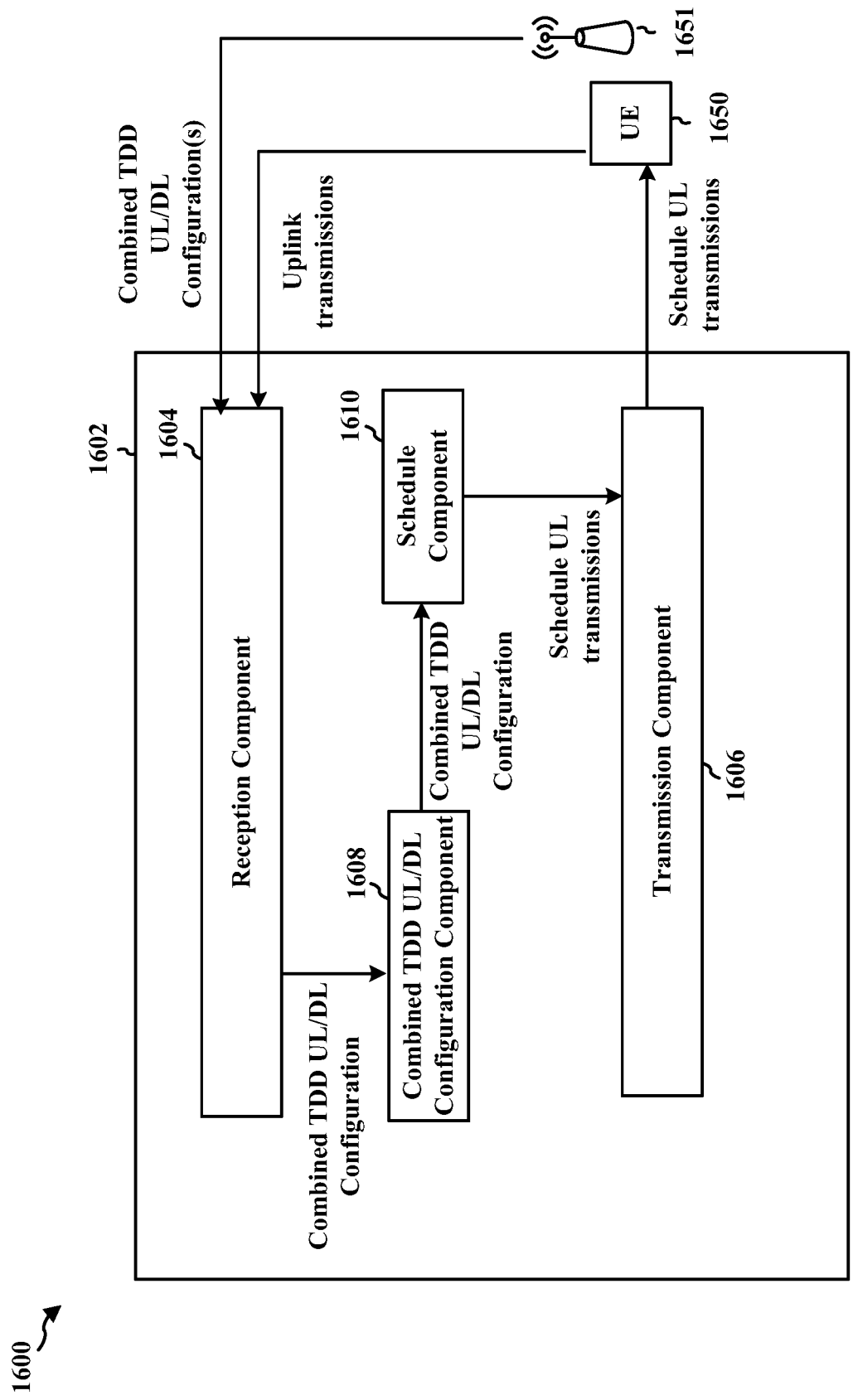
FIG. 16 is a conceptual data flow diagram illustrating the data flow between different means/components in an example apparatus.

FIG. 16 is a conceptual data flow diagram 1600 illustrating the data flow between different means/components in an example apparatus 1602. The apparatus may be a base station or a component of a base station. The apparatus includes a reception component 1604 that receives communication from UE 1650 and from base station 1751. The apparatus includes a transmission component that transmits downlink communication to the UE 1750. The apparatus includes a combined TDD UL/DL configuration component 1608 configured to receives, from a second base station that communicates with a UE using a second RAT, a combined TDD UL/DL configuration for the UE based on a first TDD UL/DL configuration for a first cell using the second RAT and a second TDD UL/DL configuration for a second cell using the second RAT, e.g., as described in connection with 1502 in FIG. 15. The apparatus includes a schedule component 1610 that schedules communication with the UE using the first RAT based on the combined TDD UL/DL configuration received from the second base station, e.g., as described in connection with 1504 in FIG. 15.

The apparatus may include additional components that perform each of the blocks of the algorithm in the aforementioned flowchart of FIG. 15 and aspects performed by the base station 804 in FIG. 8. As such, each block in the aforementioned flowchart of FIG. 15 and aspects performed by the base station 804 in FIG. 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 17:
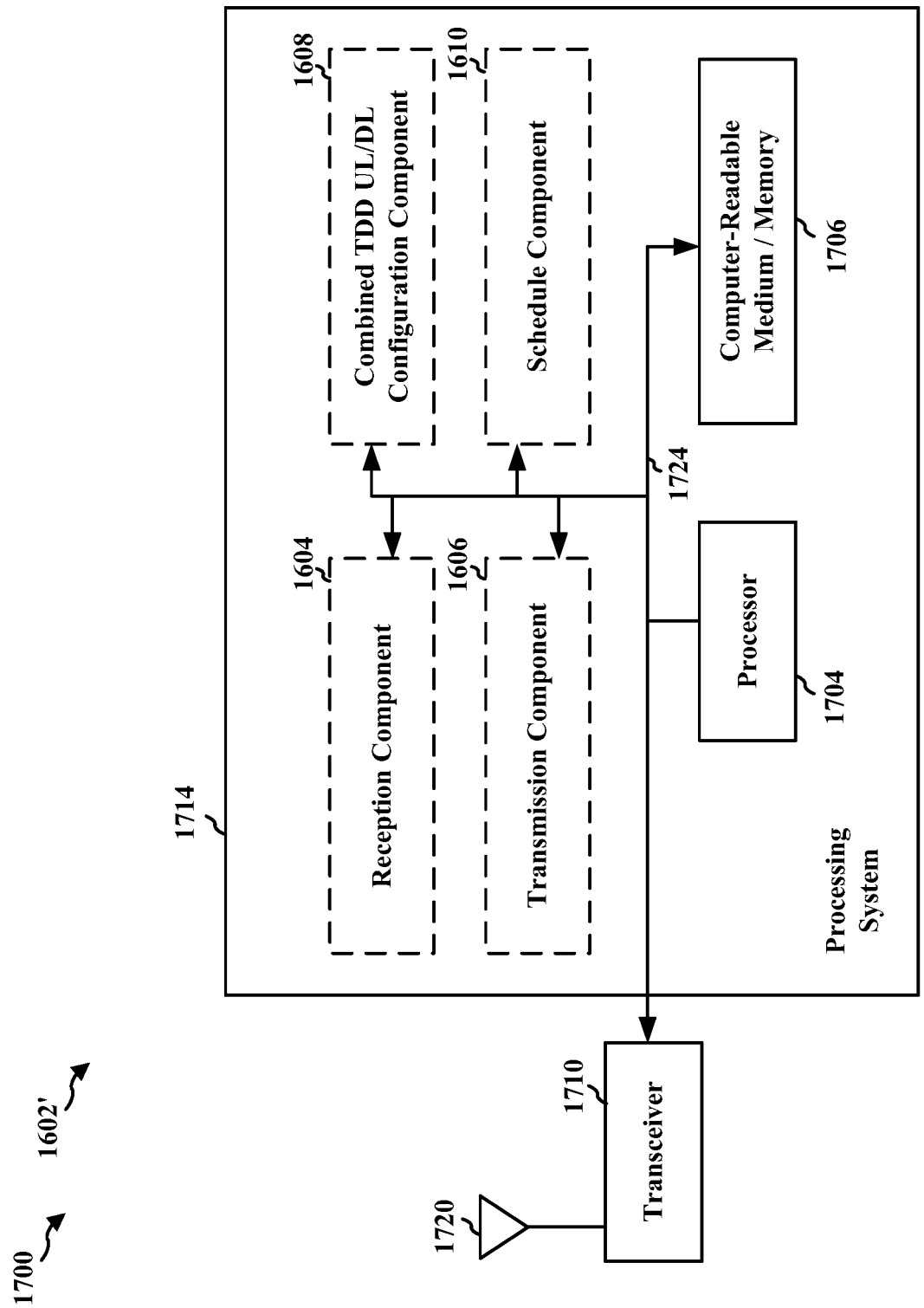
FIG. 17 is a diagram illustrating an example of a hardware implementation for an apparatus employing a processing system.

FIG. 17 is a diagram 1700 illustrating an example of a hardware implementation for an apparatus 1602' employing a processing system 1714. The processing system 1714 may be implemented with a bus architecture, represented generally by the bus 1724. The bus 1724 may include any number of interconnecting buses and bridges depending on the specific application of the processing system 1714 and the overall design constraints. The bus 1724 links together various circuits including one or more processors and/or hardware components, represented by the processor 1704, the components 1604, 1606, 1608, 1610, and the computer-readable medium/memory 1706. The bus 1724 may also link various other circuits such as timing sources, peripherals, voltage regulators, and power management circuits, which are well known in the art, and therefore, will not be described any further.

The processing system 1714 may be coupled to a transceiver 1710. The transceiver 1710 is coupled to one or more antennas 1720. The transceiver 1710 provides a means for communicating with various other apparatus over a transmission medium. The transceiver 1710 receives a signal from the one or more antennas 1720, extracts information from the received signal, and provides the extracted information to the processing system 1714, specifically the reception component 1604. In addition, the transceiver 1710 receives information from the processing system 1714, specifically the transmission component 1606, and based on the received information, generates a signal to be applied to the one or more antennas 1720. The processing system 1714 includes a processor 1704 coupled to a computer-readable medium/memory 1706. The processor 1704 is responsible for general processing, including the execution of software stored on the computer-readable medium/memory 1706. The software, when executed by the processor 1704, causes the processing system 1714 to perform the various functions described supra for any particular apparatus. The computer-readable medium/memory 1706 may also be used for storing data that is manipulated by the processor 1704 when executing software. The processing system 1714 further includes at least one of the components 1604, 1606, 1608, 1610. The components may be software components running in the processor 1704, resident/stored in the computer readable medium/memory 1706, one or more hardware components coupled to the processor 1704, or some combination thereof. The processing system 1714 may be a component of the base station 310 and may include the memory 376 and/or at least one of the TX processor 316, the RX processor 370, and the controller/processor 375. Alternatively, the processing system 1714 may be the entire base station (e.g., see 310 of FIG. 3).

In one configuration, the apparatus 1602/1602' for wireless communication includes means for receiving, from a second base station that communicates with a UE using a second RAT, a combined TDD UL/DL configuration for the UE based on a first TDD UL/DL configuration for a first cell using the second RAT and a second TDD UL/DL configuration for a second cell using the second RAT; and means for scheduling communication with the UE using the first RAT based on the combined TDD UL/DL configuration received from the second base station. The aforementioned means may be one or more of the aforementioned components of the apparatus 1602 and/or the processing system 1714 of the apparatus 1602' configured to perform the functions recited by the aforementioned means. As described supra, the processing system 1714 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a User Equipment (UE), comprising:
 receiving a first Time Division Duplex Uplink/Downlink (TDD UL/DL) configuration for a first cell using a first Radio Access Technology (RAT);
 receiving a second TDD UL/DL configuration for a second cell using the first RAT;
 determining whether there is a potential overlap between a first uplink transmission using a second RAT and a possible uplink transmission based on the first TDD UL/DL configuration for the first cell using the first RAT and whether there is the potential overlap between the first uplink transmission using the second RAT and the second TDD UL/DL configuration for the second cell using the first RAT; and
 determining a maximum transmission power for the first uplink transmission using the second RAT based on whether there is the potential overlap between the first uplink transmission using the second RAT and the possible uplink transmission based on the first TDD UL/DL configuration or the second TDD UL/DL configuration during a period including the first uplink transmission, wherein a first maximum transmission power is used when there is the potential overlap between the first uplink transmission using the second RAT and the possible uplink transmission based on at least one of the first TDD UL/DL configuration for the first cell using the first RAT or the second TDD UL/DL configuration for the second cell using the first RAT, and a second maximum transmission power is used when there is no potential overlap between the first uplink transmission using the second RAT and the possible uplink transmission based on the first TDD UL/DL configuration or the second TDD UL/DL configuration.

2. The method of claim 1, wherein the potential overlap occurs when the first TDD UL/DL configuration or the second TDD UL/DL configuration comprises a symbol that overlaps in time with the first uplink transmission and is configured for uplink transmission or as a flexible symbol.

3. The method of claim 1, wherein the UE uses a combined TDD UL/DL configuration based on the first TDD UL/DL configuration for the first cell using the first RAT and the second TDD UL/DL configuration for the second cell using the first RAT to determine whether there is the potential overlap with the first uplink transmission using the second RAT.

4. The method of claim 3, further comprising:
receiving the combined TDD UL/DL configuration from a base station using the first RAT.

5. The method of claim 3, wherein a symbol of the combined TDD UL/DL configuration is configured as an uplink symbol or a flexible symbol when a corresponding symbol of either the first TDD UL/DL configuration or the second TDD UL/DL configuration is configured for the uplink symbol or the flexible symbol.

6. The method of claim 3, wherein the combined TDD UL/DL configuration is based on a subcarrier spacing of the second RAT.

7. The method of claim 3, wherein the combined TDD UL/DL configuration is based on a reference subcarrier spacing.

8. The method of claim 3, further comprising:
transmitting a second transmission to the first cell based on the first TDD UL/DL configuration; and
transmitting a third transmission to the second cell based on the second TDD UL/DL configuration.

9. The method of claim 3, further comprising:
determining whether to transmit a third transmission to a Frequency Division Duplex (FDD) cell using the first RAT based on whether the third transmission would potentially overlap with the possible uplink transmission based on the first TDD UL/DL configuration or the second TDD UL/DL configuration.

10. The method of claim 9, wherein the UE transmits to the FDD cell using the first RAT when the third transmission would not potentially overlap with the possible uplink transmission based on the first TDD UL/DL configuration or the second TDD UL/DL configuration, and wherein the UE refrains from transmitting to the FDD cell using the first RAT when the third transmission would potentially overlap with the possible uplink transmission based on the first TDD UL/DL configuration or the second TDD UL/DL configuration.

11. An apparatus for wireless communication at a User Equipment (UE), comprising:
a memory; and
at least one processor coupled to the memory and configured to:
receive a first Time Division Duplex Uplink/Downlink (TDD UL/DL) configuration for a first cell using a first Radio Access Technology (RAT);
receive a second TDD UL/DL configuration for a second cell using the first RAT;
determine whether there is a potential overlap between a first uplink transmission using a second RAT and a possible uplink transmission based on the first TDD UL/DL configuration for the first cell using the first RAT and whether there is the potential overlap between the first uplink transmission using the second RAT and the second TDD UL/DL configuration for the second cell using the first RAT; and
determine a maximum transmission power for the first uplink transmission using the second RAT based on whether there is the potential overlap between the first uplink transmission using the second RAT and the possible uplink transmission based on the first TDD UL/DL configuration or the second TDD UL/DL configuration during a period including the first uplink transmission, and wherein the apparatus is configured to use a first maximum transmission power when there is the potential overlap between the first uplink transmission using the second RAT and the possible uplink transmission based on the first TDD UL/DL configuration or the second TDD UL/DL configuration, and to use a second maximum transmission power when there is no potential overlap between the first uplink transmission using the second RAT and the possible uplink transmission based on the first TDD UL/DL configuration or the second TDD UL/DL configuration.

12. The apparatus of claim 11, wherein the apparatus is configured to determine that the potential overlap occurs when the first TDD UL/DL configuration or the second TDD UL/DL configuration comprises a symbol that overlaps in time with the first uplink transmission and is configured for uplink transmission or as a flexible symbol.

13. The apparatus of claim 11, wherein the apparatus is configured to use a combined TDD UL/DL configuration based on the first TDD UL/DL configuration and the second TDD UL/DL configuration to determine whether there is the potential overlap with the first uplink transmission using the second RAT.

14. The apparatus of claim 13, wherein the at least one processor is further configured to:
receive the combined TDD UL/DL configuration from a base station using the first RAT.

15. The apparatus of claim 13, wherein a symbol of the combined TDD UL/DL configuration is configured as an uplink symbol or a flexible symbol when a corresponding symbol of either the first TDD UL/DL configuration or the second TDD UL/DL configuration is configured for the uplink symbol or the flexible symbol.

16. The apparatus of claim 13, wherein the combined TDD UL/DL configuration is based on a subcarrier spacing of the second RAT.

17. The apparatus of claim 13, wherein the combined TDD UL/DL configuration is based on a reference subcarrier spacing.

18. The apparatus of claim 13, wherein the at least one processor is further configured to:
transmit a second transmission to the first cell based on the first TDD UL/DL configuration; and
transmit a third transmission to the second cell based on the second TDD UL/DL configuration.

19. The apparatus of claim 13, wherein the at least one processor is further configured to:
   determine whether to transmit a third transmission to a Frequency Division Duplex (FDD) cell using the first RAT based on whether the third transmission would potentially overlap with the possible uplink transmission based on the first TDD UL/DL configuration or the second TDD UL/DL configuration.

20. The apparatus of claim 19, wherein the apparatus is configured to transmit to the FDD cell using the first RAT when the third transmission would not potentially overlap with the possible uplink transmission based on the first TDD UL/DL configuration or the second TDD UL/DL configuration, and wherein the apparatus is configured to refrain from transmitting to the FDD cell using the first RAT when the third transmission would potentially overlap with the possible uplink transmission based on the first TDD UL/DL configuration or the second TDD UL/DL configuration.

* * * * *